(12) United States Patent
Nishino

(10) Patent No.: US 11,086,329 B2
(45) Date of Patent: Aug. 10, 2021

(54) AUTONOMOUS MOVING BODY, COLLISION POSITION DETECTION METHOD OF AUTONOMOUS MOVING BODY, AND PROGRAM

(71) Applicant: TOYOTA JIDOSHA KABUSHIKI KAISHA, Toyota (JP)

(72) Inventor: Tamaki Nishino, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 16/384,222

(22) Filed: Apr. 15, 2019

(65) Prior Publication Data
US 2019/0361458 A1    Nov. 28, 2019

(30) Foreign Application Priority Data
May 23, 2018    (JP) .............................. JP2018-098983

(51) Int. Cl.
*G05D 1/02*    (2020.01)

(52) U.S. Cl.
CPC ......... *G05D 1/0227* (2013.01); *G05D 1/0238* (2013.01); *G05D 1/0272* (2013.01); *G05D 2201/0216* (2013.01)

(58) Field of Classification Search
CPC .. G05D 1/0227; G05D 1/0272; G05D 1/0238; G05D 1/024; G05D 2201/0216; B25J 9/1676; B25J 19/0091
See application file for complete search history.

(56) References Cited

U.S. PATENT DOCUMENTS

| 4,962,453 A | * | 10/1990 | Pong, Jr. ............... | G05D 1/0272 701/23 |
| 2003/0025472 A1 | * | 2/2003 | Jones .................... | G05D 1/0227 318/568.12 |
| 2012/0173070 A1 | | 7/2012 | Schnittman | |
| 2015/0214260 A1 | * | 7/2015 | Inui .................... | H01L 27/14641 257/222 |
| 2017/0079499 A1 | | 3/2017 | Schnittman et al. | |

FOREIGN PATENT DOCUMENTS

| JP | 62-293320 | * | 12/1987 |
| JP | 2007-011857 A | | 1/2007 |
| JP | 4264391 B2 | | 5/2009 |
| JP | 5926304 B2 | | 5/2016 |
| JP | 6030727 B2 | | 11/2016 |

* cited by examiner

*Primary Examiner* — Michael J Zanelli
(74) *Attorney, Agent, or Firm* — Oliff PLC

(57) ABSTRACT

An autonomous moving body includes a main body, a bumper, collision detection sensor and position detection processor. A detection range of an obstacle with respect to the bumper is set along the bumper with a travelling direction of a main body as a center. In case of detecting the collision of the bumper with the obstacle, the position detection means moves the main body by a predetermined distance toward a vertical direction with respect to a line in the travelling direction that divides the detection range into two ranges and in a direction on a side of one of the two ranges. In case of detecting a collision with the obstacle after the movement, the position detection processor detects the one range as the collision position, and in case of not detecting a collision with the obstacle, the position detection processor detects the other range as the collision position.

6 Claims, 8 Drawing Sheets

AUTONOMOUS MOVING BODY, COLLISION POSITION DETECTION METHOD OF AUTONOMOUS MOVING BODY, AND PROGRAM

CROSS REFERENCE TO RELATED APPLICATIONS

This application is based upon and claims the benefit of priority from Japanese patent application No. 2018-098983, filed on May 23, 2018, the disclosure of which is incorporated herein in its entirety by reference.

BACKGROUND

The present disclosure relates to an autonomous moving body configured to detect a collision with an obstacle, a collision position detection method of the autonomous moving body, and a program.

An autonomous moving body including a movable main body, a bumper provided along an outer edge of a main body, a plurality of collision detection means for detecting a collision of the bumper with an obstacle, and position detection means for detecting a position in the bumper at which it collides with the obstacle based on the collision with the obstacle detected by each of the collision detection means has been known (see Japanese Patent No. 6030727). Another autonomous moving body that detects a moment that has been generated in a bumper when the bumper collides with an obstacle by a force sensor and detects the position of the collision based on the moment that has been detected has been known (see Japanese Patent No. 4264391).

SUMMARY

In the autonomous moving body disclosed in Japanese Patent No. 6030727, the plurality of collision detection means need to be provided, which may cause an increase in the cost. Further, in the autonomous moving body disclosed in Japanese Patent No. 4264391 as well, an expensive force sensor needs to be provided, which may cause an increase in the cost.

The present disclosure has been made in order to solve the aforementioned problems and mainly aims to provide an autonomous moving body capable of specifying in detail the position in the bumper at which it collides with the obstacle while reducing the cost, a collision position detection method of the autonomous moving body, and a program.

One aspect of the present disclosure in order to accomplish the aforementioned object is an autonomous moving body including:
 a movable main body;
 a bumper that is provided along an outer edge of the main body;
 collision detection means that is provided along the bumper and detects a collision of the bumper with an obstacle; and
 position detection means for detecting a position in the bumper at which it collides with the obstacle based on the collision with the obstacle detected by the collision detection means, in which
 a detection range of the obstacle with respect to the bumper detected by the position detection means is set along the bumper with a travelling direction of the main body as a center, when the position detection means has detected the collision of the bumper with the obstacle, the position detection means moves the main body by a predetermined distance toward a vertical direction with respect to a line in the travelling direction that divides the detection range into two ranges and in a direction on a side of one of the two ranges into which detection range is divided, when the collision detection means has detected the collision with the obstacle after the main body has been moved, the position detection means detects one of the two ranges into which the detection range is divided as the collision position, and when the collision detection means has not detected a collision with the obstacle, the position detection means detects the other one of the two ranges into which the detection range is divided as the collision position.

In this aspect, after the position detection means has moved the main body rearward, the position detection means may further move the main body by a predetermined distance toward a vertical direction with respect to a line that further divides the range in which the collision position has been detected into two and in a direction on a side of one of the two ranges into which this range is divided, and in a case in which the collision detection means has detected a collision with the obstacle when the main body is moved, the position detection means may detect one of the two ranges into which the detection range is divided as the collision position, and in a case in which the collision detection means has not detected a collision with the obstacle, the position detection means may detect the other one of the two ranges into which the detection range is divided as the collision position.

In this aspect, the position detection means may repeat the movement of the main body in the vertical direction and on a side of one range, and the detection of the collision position a predetermined number of times.

In this aspect, the position detection means may repeat the movement of the main body in the vertical direction and on a side of one range, and the detection of the collision position until a width of a range including the specified collision position becomes equal to or smaller than a predetermined width.

One aspect of the present disclosure in order to accomplish the aforementioned object may be a collision position detection method of an autonomous moving body including:
 a movable main body;
 a bumper that is provided along an outer edge of the main body;
 collision detection means that is provided along the bumper and detects a collision of the bumper with an obstacle; and
 position detection means for detecting a position in the bumper at which it collides with the obstacle based on the collision with the obstacle detected by the collision detection means, in which
 a detection range of the obstacle with respect to the bumper detected by the position detection means is set along the bumper with a travelling direction of the main body as a center, when the collision of the bumper with the obstacle has been detected, the main body is moved by a predetermined distance toward a vertical direction with respect to a line in the travelling direction that divides the detection range into two ranges and in a direction on a side of one of the two ranges into which the detection range is divided, and when the collision detection means has detected a collision with the obstacle after the main body has been moved, one of the two ranges into which the detection range is divided is detected as the collision position, and when the collision detection means has not detected a collision with the obstacle, the other one of the two ranges into which the detection range is divided is detected as the collision position.

One aspect of the present disclosure in order to accomplish the aforementioned object may be a program of an autonomous moving body including:

a movable main body;

a bumper that is provided along an outer edge of the main body;

collision detection means that is provided along the bumper and detects a collision of the bumper with an obstacle; and position detection means for detecting a position in the bumper at which it collides with the obstacle based on the collision with the obstacle detected by the collision detection means, in which a detection range of the obstacle with respect to the bumper detected by the position detection means is set along the bumper with a travelling direction of the main body as a center, the program causing a computer to execute the following processing of:

moving, when the collision of the bumper with the obstacle has been detected, the main body by a predetermined distance toward a vertical direction with respect to a line in the travelling direction that divides the detection range into two ranges and in a direction on a side of one of the two ranges into which the detection range is divided, and detecting, when the collision detection means has detected a collision with the obstacle after the main body has been moved, one of the two ranges into which the detection range is divided as the collision position, and detecting, when the collision detection means has not detected a collision with the obstacle, the other one of the two ranges into which the detection range is divided as the collision position.

According to the present disclosure, it is possible to provide an autonomous moving body, a collision position detection method of the autonomous moving body, and a program capable of specifying in detail the position in the bumper at which it collides with the obstacle while reducing the cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
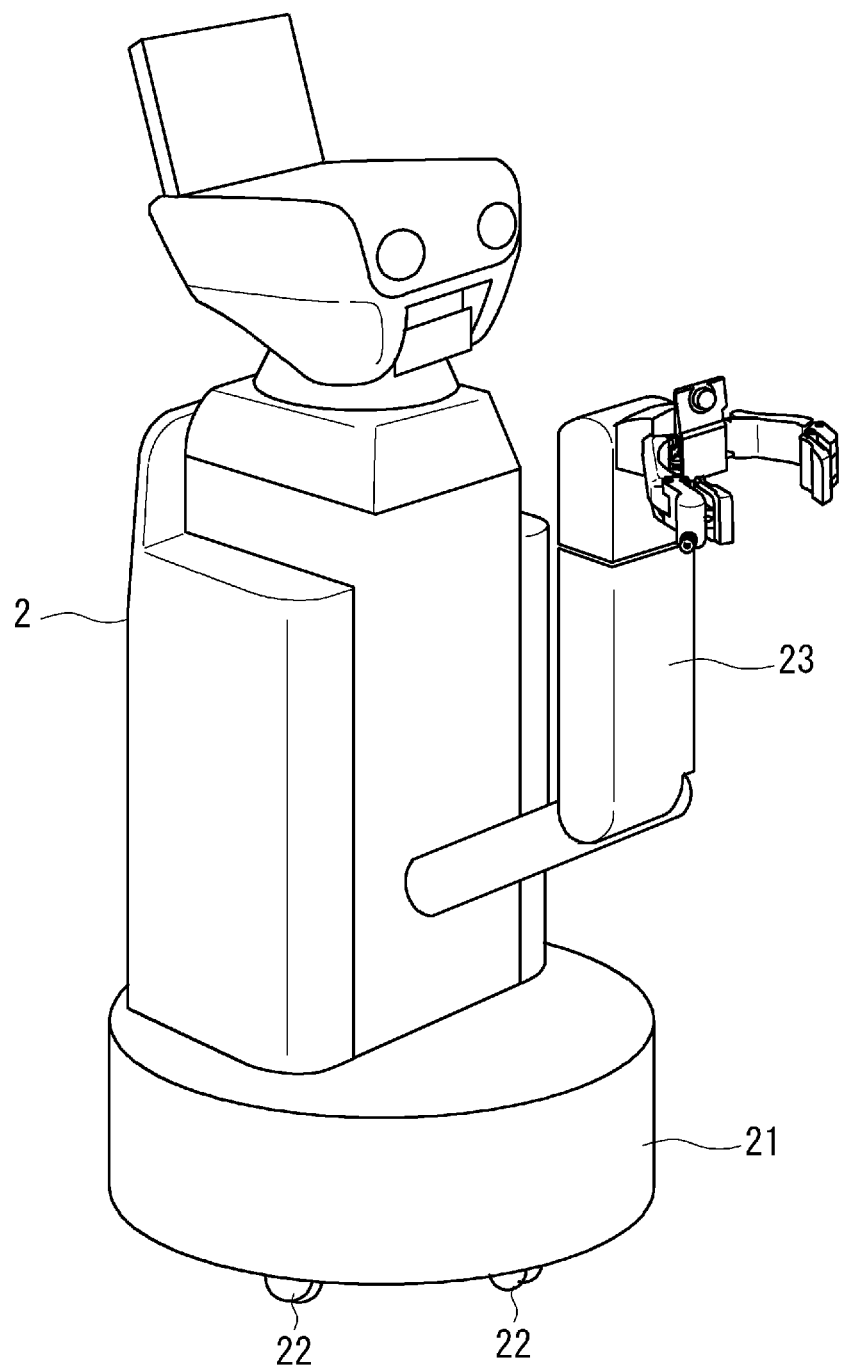
FIG. 1 is a diagram showing a schematic configuration of an autonomous moving body according to a first embodiment of the present disclosure.
Figure 2:
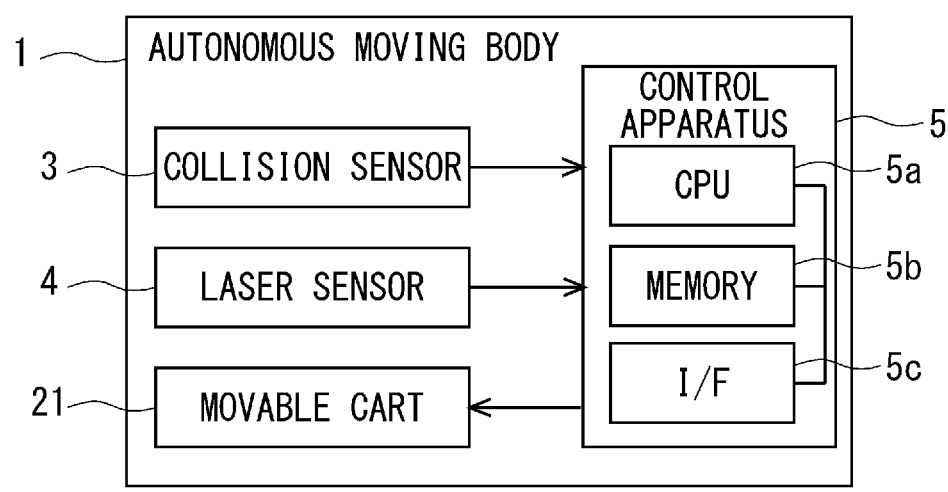
FIG. 2 is a block diagram showing a schematic system configuration of the autonomous moving body according to the first embodiment of the present disclosure.

Hereinafter, with reference to the drawings, embodiments of the present disclosure will be explained. FIG. 1 is a diagram showing a schematic configuration of an autonomous moving body according to a first embodiment of the present disclosure. FIG. 2 is a block diagram showing a schematic system configuration of the autonomous moving body according to the first embodiment of the present disclosure.

An autonomous moving body 1 according to the first embodiment is formed, for example, as an autonomous moving robot that moves to a predetermined place and autonomously performs operations. The autonomous moving body 1 according to the first embodiment includes a movable main body 2. A substantially cylindrical movable cart 21 is provided in the lower end of the main body 2. The movable cart 21 includes a plurality of wheels 22 and a plurality of motors that rotate the respective wheels 22. The motors rotate the respective wheels 22, whereby it is possible to move the main body 2 to a desired position.

The main body 2 is provided with a robot art 23 capable of gripping and moving an object. The robot arm 23 is formed, for example, as an articulated arm that includes a plurality of joints.

A bumper 24 for absorbing a collision force with an obstacle is provided in the outer edge of the movable cart 21 along this outer edge. The bumper 24 is provided along the circumference of the movable cart 21. The bumper 24 may be integrally formed in the movable cart 21.

The autonomous moving body 1 according to the first embodiment includes, as shown in FIG. 2, a collision sensor 3 configured to detect a collision of the bumper 24 with the obstacle, a laser sensor 4 configured to detect information regarding the distance from the obstacle, the movable cart 21, and a control apparatus 5 configured to control the movement of the movable cart 21.

The collision sensor 3 is one specific example of collision detection means. When the collision sensor 3 detects a collision of the bumper 24 with the obstacle, the collision sensor 3 outputs a collision signal to the control apparatus 5. The collision sensor 3 is formed of, for example, a foldable tube member or the like that is embedded in the bumper 24.

When the obstacle collides with the bumper 24, the tube member inside the bumper 24 is deformed. Due to this deformation of the tube member, the pressure inside the tube member is changed. The collision sensor 3 detects this change in the pressure, thereby detecting the collision of the bumper 24 with the obstacle. The aforementioned configuration of the collision sensor 3 is merely one example, and the configuration of the collision sensor 3 is not limited thereto. The collision sensor 3 is formed of, for example, optical fibers or the like, and may detect a collision with the obstacle based on a change in an amount of light.

Figure 3:
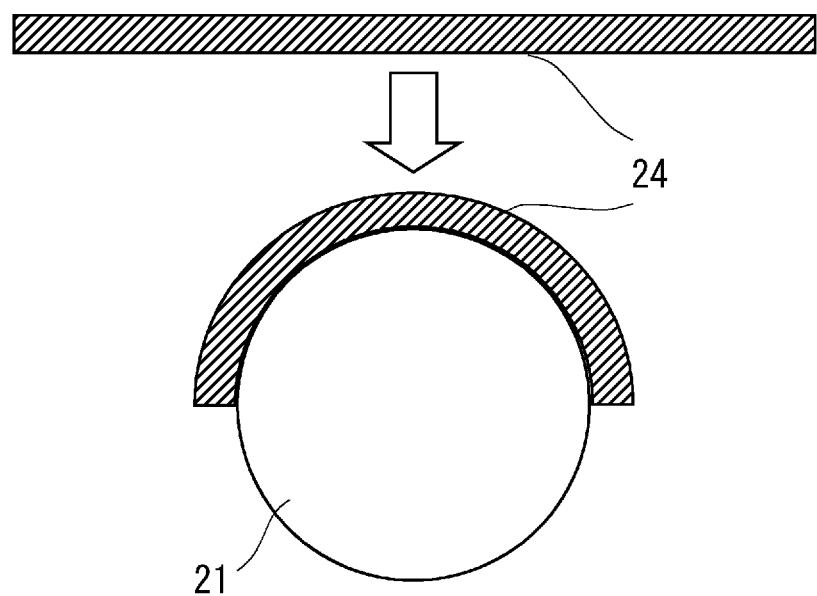
FIG. 3 is a diagram showing a collision sensor wrapped around a bumper.

As shown in FIG. 3, the collision sensor 3 is integrally provided with the bumper 24 in such a way that the collision sensor 3 is wrapped around the bumper 24. It is sufficient that the collision sensor 3 be wrapped around the bumper 24 at least half of the circumference (180°) or more of the movable cart 21 with the travelling direction of the main body 2 as a center. Accordingly, the collision sensor 3 is able to detect a collision with the obstacle at least at a half of the circumference of the movable cart 21 on the side of the travelling direction. Further, the collision sensor 3 is provided in the bumper 24 as a single sensor, whereby it is possible to simplify the structure and to reduce the cost compared to a case in which a plurality of collision sensors are provided.

The laser sensor 4 is provided in the main body 2. The laser sensor 4 outputs laser beams in the horizontal direction, thereby acquiring distance information of the obstacle. The laser sensor 4 outputs the distance information of the obstacle that has been detected to the control apparatus 5.

The control apparatus 5 is formed of hardware, and mainly includes, for example, a microcomputer including a Central Processing Unit (CPU) 5a that performs control processing, operation processing and the like, a memory 5b formed of a Read Only Memory (ROM) and a Random Access Memory (RAM) that store a control program, an operation program and the like executed by the CPU 5a, and an interface unit (I/F) 5c that receives or outputs a signal from or to an external device. The CPU 5a, the memory 5b, and the interface unit 5c are interconnected with one another via a data bus or the like.

The control apparatus 5 autonomously moves the autonomous moving body 1 to a target position in such a way that the autonomous moving body 1 avoids an obstacle which is in the vicinity of the autonomous moving body 1 while estimating the position of the autonomous moving body 1 based on an environmental map indicating an environment in which the autonomous moving body 1 moves and distance information on the obstacle detected by the laser sensor 4. In this case, the laser sensor 4 can detect the obstacle only in the horizontal direction in which the laser sensor 4 is provided, and also the range in which the obstacle can be detected is limited to a front side of the autonomous moving body 1.

Therefore, the laser sensor 4 cannot detect a low obstacle on the floor or an obstacle which is located in a lateral side or a back side of the autonomous moving body 1. In order to compensate for this, as described above, the collision sensor 3 configured to detect a collision with the obstacle is provided in the bumper 24 of the main body 2. The control apparatus 5 autonomously moves the autonomous moving body 1 to the target position while avoiding a surrounding obstacle based on, besides the distance information of the obstacle detected by the laser sensor 4, the collision detected by the collision sensor 3. Accordingly, the autonomous moving body 1 is able to move while avoiding an obstacle more definitely. In this way, the collision sensor 3 plays an important role of compensating for the lack in the laser sensor 4.

Figure 4:
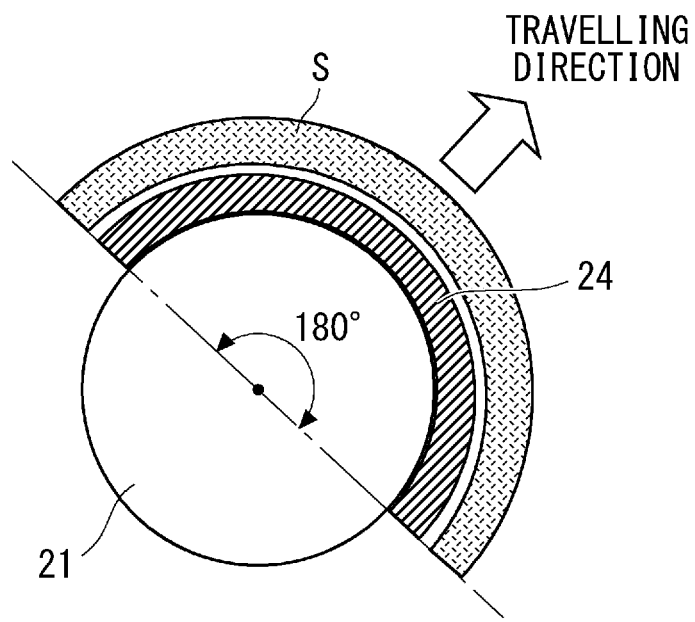
FIG. 4 is a diagram showing a detection range of an obstacle with respect to the bumper.

Incidentally, when the collision sensor 3 is provided in the bumper 24 as a single sensor, as described above, a detection range S of the obstacle with respect to the bumper 24 is set in a range of 180° along the longitudinal direction of the bumper 24 with the travelling direction of the main body 2 as a center (FIG. 4).

Accordingly, according to related art, it can be understood that, when an obstacle collides with a bumper, the collision position is within a detection range S of 180° with the travelling direction of the main body as a center. It is difficult, however, to specify the collision position in more detail, that is, where in the detection range S the collision position is located.

On the other hand, when the autonomous moving body 1 according to the first embodiment detects the collision of the bumper 24 with the obstacle, the autonomous moving body 1 moves the main body 2 by a predetermined distance toward the vertical direction with respect to the line in the travelling direction that divides the detection range S into two ranges and in the direction on the side of one of the two ranges into which the detection range is divided. Further, when the collision sensor 3 has detected a collision with the obstacle after the autonomous moving body 1 has moved the main body 2, the autonomous moving body 1 detects one of the two ranges into which the detection range S is divided as a collision position. When the collision sensor 3 has not detected a collision with the obstacle, the autonomous moving body 1 detects the other one of the two ranges into which the detection range S is divided as a collision position.

As described above, the collision sensor 3 is provided in the bumper 24 as a single sensor, whereby it is possible to reduce the cost. Further, one of the one range and the other range into which the detection range S is divided can be specified as the collision position, whereby it is possible to specify the collision position of the obstacle in more detail. That is, it is possible to specify in detail the position in the bumper 24 at which it collides with the obstacle while reducing the cost. The autonomous moving body 1 specifies in detail the position in the bumper 24 at which it collides with the obstacle, whereby it is possible to avoid this obstacle with a minimum alternative route.

Figure 5:
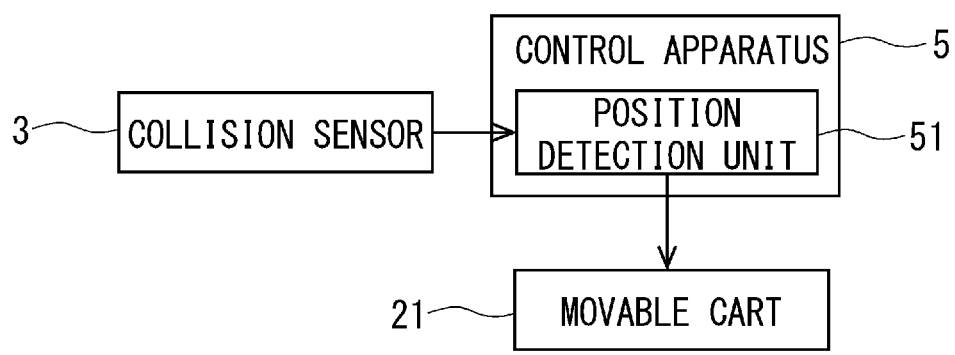
FIG. 5 is a block diagram showing a schematic system configuration of a control apparatus according to the first embodiment of the present disclosure.

FIG. 5 is a block diagram showing a schematic system configuration of a control apparatus according to the first embodiment. The control apparatus 5 according to the first embodiment includes a position detection unit 51 configured to detect the position in the bumper 24 at which it collides with the obstacle based on the collision signal from the collision sensor 3. The position detection unit 51 is one specific example of position detection means.

Figure 6:
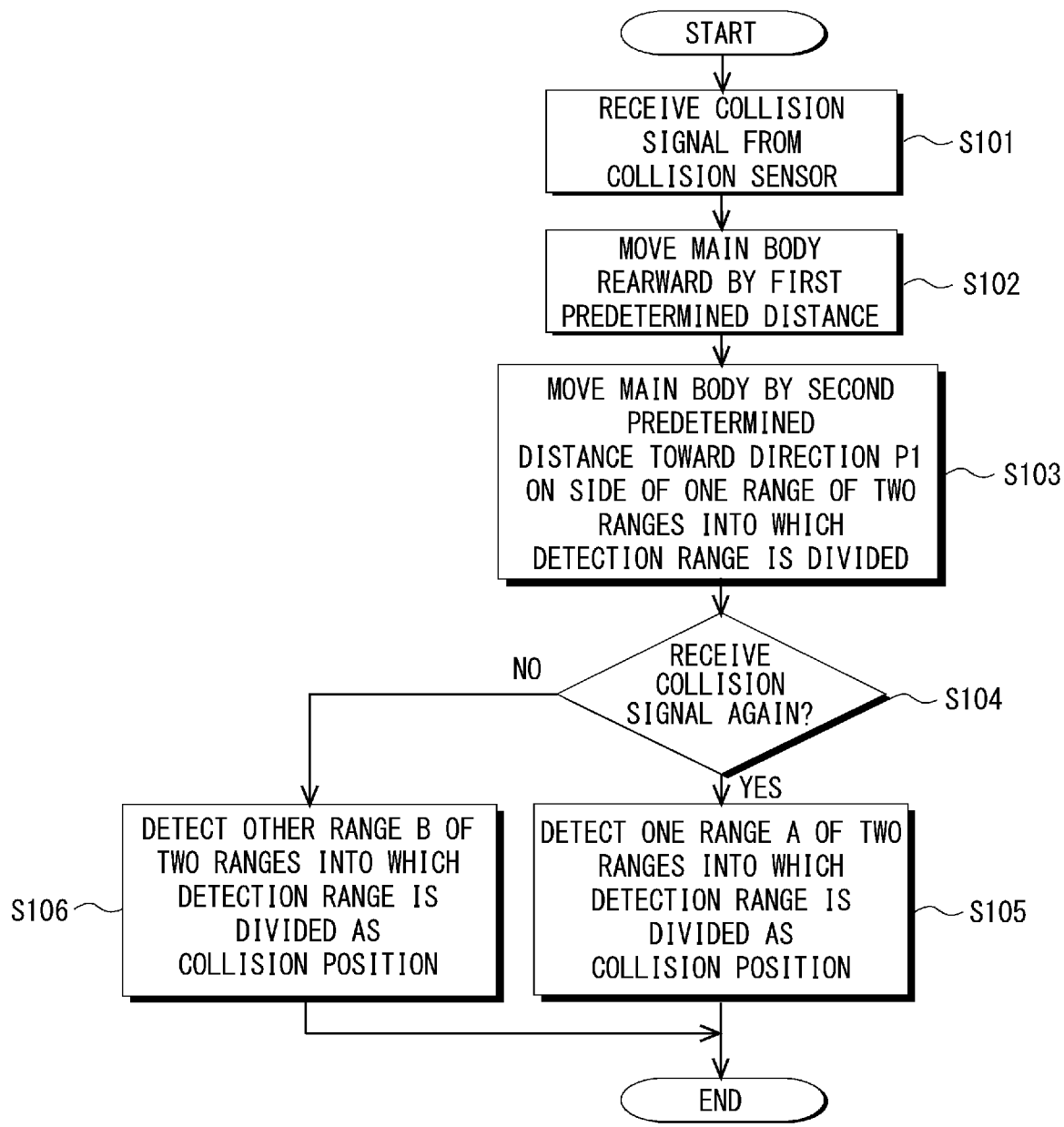
FIG. 6 is a flowchart showing a flow of a collision position detection method of the autonomous moving body according to the first embodiment of the present disclosure.

FIG. 6 is a flowchart showing a flow of a collision position detection method of the autonomous moving body according to the first embodiment. The process flow shown in FIG. 6 is repeatedly executed, for example, at predetermined time intervals.

Figure 7:
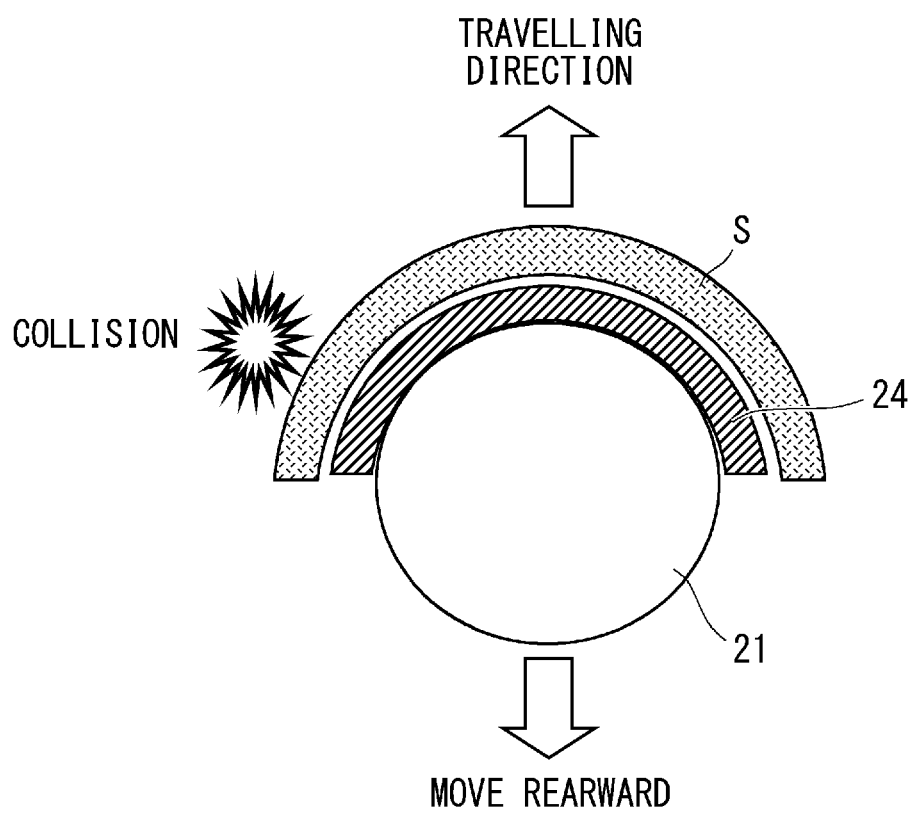
FIG. 7 is a diagram showing a state in which a collision signal is received from a collision sensor and a main body is moved rearward.

As shown in FIG. 7, when the position detection unit 51 receives a collision signal from the collision sensor 3 (Step S101), the position detection unit 51 moves the main body 2 rearward by a first predetermined distance (Step S102). Accordingly, the bumper 24 is away from the obstacle. An optimal value that has been experimentally obtained is set as the first predetermined distance in the memory 5b.

Figure 8:
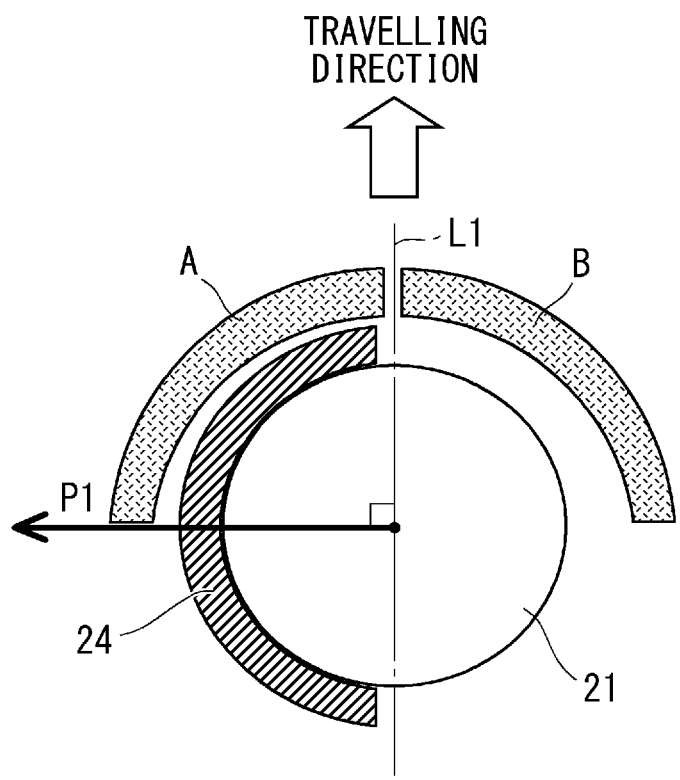
FIG. 8 is a diagram showing a state in which the main body is moved toward a direction P1 on a side of one of the two ranges into which the detection range is divided.

After the main body 2 has moved rearward, the position detection unit 51 moves the main body 2 by a second predetermined distance toward the vertical direction with respect to a line L1 in the travelling direction that passes the center of the movable cart 21 and divides the detection range S into two and in a direction P1 on the side of one range A of the two ranges into which the detection range S is divided, as shown in FIG. 8 (Step S103). An optimal value that has been experimentally obtained is set as the second predetermined distance in the memory 5b.

When the position detection unit 51 has received the collision signal again from the collision sensor 3 after the main body 2 has moved as described above (YES in Step S104), the position detection unit 51 detects one range A of the two ranges into which the detection range S is divided as the collision position (Step S105). On the other hand, when the position detection unit 51 has not received the collision signal from the collision sensor 3 (NO in Step S104), the position detection unit 51 detects the other range B of the two ranges into which the detection range S is divided as the collision position (Step S106).

After the main body 2 has moved rearward, the position detection unit 51 may move the main body 2 by the second predetermined distance toward the vertical direction with respect to the line L1 in the travelling direction that divides the detection range S into two and in the direction on the side of the other range B of the two ranges into which the detection range S is divided. In this case, when the position detection unit 51 has received the collision signal again from the collision sensor 3 after the main body 2 has moved, the position detection unit 51 detects the other range B of the two ranges into which the detection range S is divided as the collision position. On the other hand, when the position detection unit 51 has not received the collision signal from the collision sensor 3, the position detection unit 51 detects one range A of the two ranges into which the detection range S is divided as the collision position.

While the position detection unit 51 randomly selects one of the direction on the side of one range A and the direction on the side of the other range B into which the detection range S is divided and moves the main body 2 toward the direction that has been selected by the second predetermined distance in the first embodiment, this embodiment is not limited thereto. The position detection unit 51 may select a pre-set direction of the direction on the side of one range A and the direction on the side of the other range B into which the detection range S is divided and move the main body 2 toward this direction that has been selected by the second predetermined distance.

Further, the position detection unit 51 may select a direction in which a part such as a robot arm of the main body that is outwardly protruded is less likely to contact the obstacle of the direction on the side of one range A and the direction on the side of the other range B into which the detection range S is divided, and move the main body 2 toward the direction that has been selected by the second predetermined distance. It is therefore possible to prevent a collision of the part such as the robot arm that is outwardly protruded with an obstacle.

As described above, when the autonomous moving body 1 according to the first embodiment detects the collision of the bumper 24 with the obstacle, the autonomous moving body 1 moves the main body 2 by a predetermined distance toward the vertical direction with respect to the line in the travelling direction that divides the detection range S into two ranges and in the direction on the side of one of the two ranges into which the detection range is divided. Further, when the collision sensor 3 has detected a collision with the obstacle after the autonomous moving body 1 has moved the main body 2, the autonomous moving body 1 detects one of the two ranges into which the detection range S is divided as the collision position. When the collision sensor 3 has not detected a collision with the obstacle, the autonomous moving body 1 detects the other one of the two ranges into which the detection range S is divided as the collision position. It is therefore possible to specify in detail the position in the bumper 24 at which it collides with the obstacle while reducing the cost.

Second Embodiment

In the autonomous moving body 1 according to the second embodiment of the present disclosure, after the position detection unit 51 has specified one of the one range and the other range into which the detection range S is divided as the collision position, a similar movement is repeated, whereby the position detection unit 51 specifies the position in the bumper 24 at which it collides with the obstacle in more detail.

Figure 9:
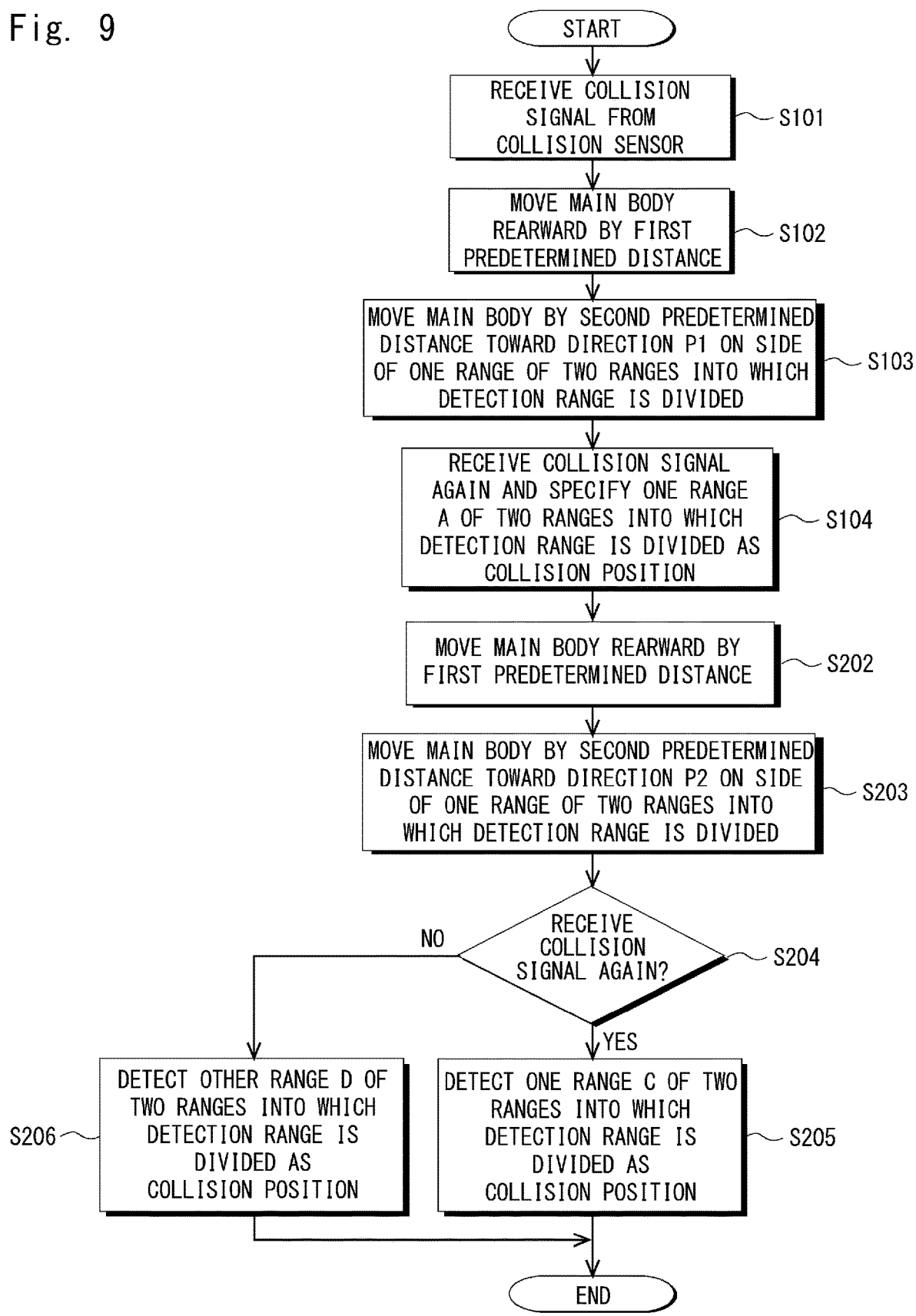
FIG. 9 is a flowchart showing a flow of a collision position detection method of an autonomous moving body according to a second embodiment of the present disclosure.

FIG. 9 is a flowchart showing a flow of a collision position detection method of the autonomous moving body according to the second embodiment. The process flow shown in FIG. 9 is repeatedly executed, for example, at predetermined time intervals.

Since (Step S101) to (Step S103) shown in FIG. 9 are the same as the processing in the aforementioned first embodiment, detailed descriptions thereof will be omitted. Further, subsequent processing in the case in which the position detection unit 51 has received a collision signal again and specified one range A of the two ranges into which the detection range S is divided as the collision position in the above (Step S104) will be explained.

Figure 10:
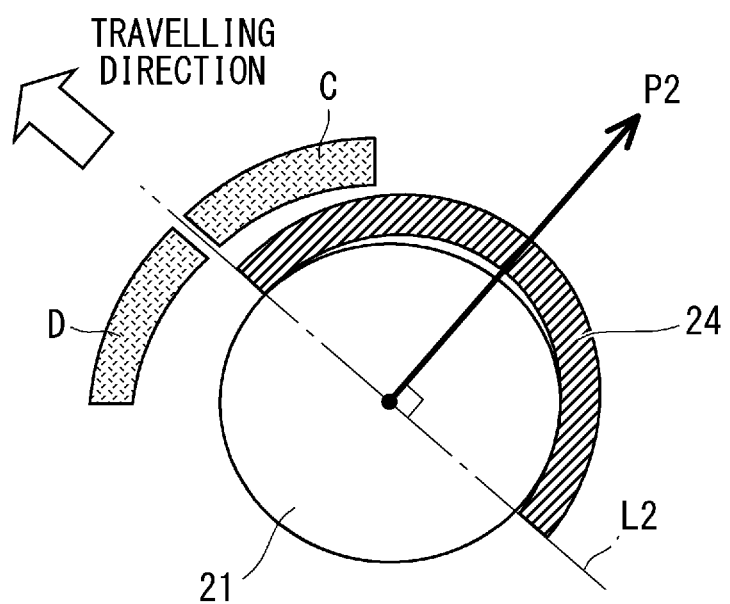
FIG. 10 is a diagram showing a state in which the main body is moved toward a direction P2 on a side of one of the two ranges into which a detection range is divided.

After the collision position has been specified, the position detection unit 51 moves the main body 2 rearward (Step S202). After the main body 2 has moved rearward, the position detection unit 51 moves the main body 2 by the second predetermined distance toward the vertical direction with respect to a line L2 that further divides the range A in which the collision position has been detected into two and in a direction P2 on the side of one range C of the two ranges into which the range A is divided, as shown in FIG. 10 (Step S203).

When the position detection unit 51 has received the collision signal again from the collision sensor 3 after the main body 2 has moved (YES in Step S204), the position detection unit 51 detects one range C of the two ranges into which the range A is divided as the collision position (Step S205). On the other hand, when the position detection unit 51 has not received the collision signal from the collision sensor 3 (NO in Step S204), the position detection unit 51 detects another range D of the two ranges into which the range A is divided as the collision position (Step S206).

In a case in which the position detection unit 51 has received the collision signal again and specified one range B of the two ranges into which the detection range S is divided as the collision position in the above (Step S104) as well, processing similar to that performed in the case in which the one range A of the two ranges into which the detection range S is divided has been specified as the collision position is performed.

After the main body 2 has moved rearward, the position detection unit 51 may move the main body 2 by the second predetermined distance toward the vertical direction with respect to the line L2 that further divides the range A in which the collision position has been detected into two and in the direction on the side of the other range D of the two ranges into which the range A is divided. In this case, when the position detection unit 51 has received the collision signal again from the collision sensor 3 after the main body 2 has moved, the position detection unit 51 detects the other range D of the two ranges into which the detection range is divided as the collision position. On the other hand, when the position detection unit 51 has not received the collision signal from the collision sensor 3, the position detection unit 51 detects one range C of the two ranges into which the detection range is divided as the collision position.

According to the second embodiment, one of the one range A and the other range B into which the detection range S is divided is specified as the collision position, and one of the one range C and the other range D into which the specified range is further divided can be specified as the collision position. Accordingly, it is possible to specify the collision position of the obstacle in more detail.

The position detection unit 51 may repeat the aforementioned rearward movement of the main body 2, the movement of the main body 2 in the vertical direction and in the side of one or the other range, and the detection of the collision position a predetermined number of times. The collision position of the obstacle can be specified in more detail as the predetermined number of repetitions increases.

The aforementioned predetermined number of times is set, for example, in the memory 5b or the like in advance. Further, the position detection unit 51 may repeat the aforementioned rearward movement of the main body 2, the movement of the main body 2 in the vertical direction and in the side of one or the other range, and the detection of the collision position until a width of the range that includes the specified collision position becomes equal to or smaller than a predetermined width. It is therefore possible to detect the collision position with a predetermined accuracy (range). The aforementioned width corresponds to the width in the longitudinal direction of the bumper 24.

For example, after the above collision position is specified as the range C, the position detection unit 51 further moves the main body 2 rearward. After the main body 2 has moved rearward, the position detection unit 51 moves the main body 2 by the second predetermined distance toward the vertical direction with respect to the line that further divides the range C in which the collision position has been detected into two and in the direction on the side of one range E of the two ranges into which the range C is divided.

When the position detection unit 51 has received the collision signal again from the collision sensor 3 after the main body 2 has moved, the position detection unit 51 detects one range E of the two ranges into which the range C is divided as the collision position. On the other hand, when the position detection unit 51 has not received the collision signal from the collision sensor 3, the position detection unit 51 detects the other range F of the two ranges into which the range C is divided as the collision position. In this way, one of the range E and the range F which are the two ranges into which the range C is further divided can be specified as the collision position from the range C.

Assume a case in which, for example, the position detection unit 51 has not received the collision signal from the collision sensor 3 and has detected the other range F of the two ranges into which the range C is divided as the collision position. When the position detection unit 51 determines that the width of the range F including the specified collision position has become equal to or smaller than a predetermined width, the position detection unit 51 finally detects this range F as the collision position. On the other hand, when the position detection unit 51 determines that the width of the range F including the specified collision position has not become equal to or smaller than the predetermined width, the position detection unit 51 repeats again the aforementioned rearward movement of the main body 2, the movement of the main body 2 in the vertical direction and on the side of one or the other range, and the detection of the collision position.

While some embodiments of this disclosure have been described above, these embodiments are presented as examples and not intended to limit the scope of the disclosure. These novel embodiments can be implemented in other various forms, and various types of omissions, substitutions, or changes can be made without departing from the spirit of the disclosure. These embodiments and their modifications, as would fall within the scope and spirit of the disclosure, are included in the disclosure provided in the claims and the scope of equivalents thereof.

While the outer edge of the movable cart 21 has a circular shape in the aforementioned embodiments, the shape of the outer edge of the movable cart 21 is not limited thereto. The outer edge of the movable cart 21 may have, for example, a polygonal shape that is close to a circular shape, or may have another shape as long as the functions and the effects according to the aforementioned embodiments are achieved.

The present disclosure is able to achieve, for example, the processing shown in FIGS. 6 and 9 by causing a CPU to execute a computer program.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.).

Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving body comprising:
 a movable main body;
 a bumper that is provided along an outer edge of the main body;
 collision detection sensor that is provided along the bumper and detects a collision of the bumper with an obstacle; and
 a processor programmed to detect a position in the bumper at which it collides with the obstacle based on the collision with the obstacle detected by the collision detection sensor, wherein
 a detection range of the obstacle with respect to the bumper detected by the processor is set along the bumper with a travelling direction of the main body as a center, when the processor has detected the collision of the bumper with the obstacle, the processor is programmed to move the main body by a predetermined distance toward a vertical direction with respect to a line in the travelling direction that divides the detection range into two ranges and in a direction on a side of one of the two ranges into which the detection range is divided, and when the collision detection sensor has detected the collision with the obstacle after the main body has been moved, the processor is programmed to detect one of the two ranges into which the detection range is divided as a collision position, and when the collision detection sensor has not detected a collision with the obstacle, the processor is programmed to detect the other one of the two ranges into which the detection range is divided as the collision position.

2. The autonomous moving body according to claim 1, wherein after the processor has moved the main body rearward, the processor is further programmed to move the main body by a predetermined distance toward a vertical direction with respect to a line that further divides the range in which the collision position has been detected into two and in the direction on the side of one of the two ranges into which this range is divided, and in a case in which the collision detection sensor has detected a collision with the obstacle when the main body is moved, the processor detects one of the two ranges into which the detection range is divided as the collision position, and in a case in which the collision detection sensor has not detected a collision with the obstacle, the processor detects the other one of the two ranges into which the detection range is divided as the collision position.

3. The autonomous moving body according to claim 2, wherein the processor is programmed to repeat the movement of the main body in the vertical direction and on a side of one range and the detection of the collision position a predetermined number of times.

4. The autonomous moving body according to claim 2, wherein the processor is programmed to repeat the movement of the main body in the vertical direction and on a side of one range and the detection of the collision position until a width of a range including the specified collision position becomes equal to or smaller than a predetermined width.

5. A collision position detection method of an autonomous moving body comprising:
providing a movable main body;
providing a bumper along an outer edge of the main body;
providing a collision detection sensor along the bumper to detect a collision of the bumper with an obstacle; and
providing a processor programmed to detect a position in the bumper at which it collides with the obstacle based on the collision with the obstacle detected by the collision detection sensor, wherein a detection range of the obstacle with respect to the bumper detected by the processor is set along the bumper with a travelling direction of the main body as a center, when the collision of the bumper with the obstacle has been detected, the processor is programmed to move the main body by a predetermined distance toward a vertical direction with respect to a line in the travelling direction that divides the detection range into two ranges and in a direction on a side of one of the two ranges into which the detection range is divided, and when the collision detection sensor has detected a collision with the obstacle after the main body has been moved, one of the two ranges into which the detection range is divided is detected as a collision position, and when the collision detection sensor has not detected a collision with the obstacle, the other one of the two ranges into which the detection range is divided is detected as the collision position.

6. A non-transitory computer readable medium storing a program of an autonomous moving body, the body including a a movable main body, a bumper that is provided along an outer edge of the main body, and a collision detection sensor that is provided along the bumper and detects a collision of the bumper with an obstacle, the program containing instructions to cause a processor to:

detect a position in the bumper at which it collides with the obstacle based on the collision with the obstacle detected by the collision detection sensor, wherein a detection range of the obstacle with respect to the bumper detected by the processor is set along the bumper with a travelling direction of the main body as a center;

move the main body by a predetermined distance toward a vertical direction with respect to a line in the travelling direction that divides the detection range into two ranges and in a direction on a side of one of the two ranges into which the detection range is divided when the collision of the bumper with the obstacle has been detected;

detect one of the two ranges into which the detection range is divided as a collision position when the collision detection sensor has detected a collision with the obstacle after the main body has been moved; and detect the other one of the two ranges into which the detection range is divided as the collision position when the collision detection sensor has not detected a collision with the obstacle.

* * * * *